(12) United States Patent
Seo et al.

(10) Patent No.: US 7,635,040 B2
(45) Date of Patent: Dec. 22, 2009

(54) COOLING SYSTEM FOR BATTERY UNIT AND MOTOR CONTROL UNIT OF HYBRID VEHICLE

(75) Inventors: Young-Jin Seo, Gyeonggi-do (KR); Jin Ho Park, Seoul (KR); Dae-Woong Lee, Daejeon (KR)

(73) Assignees: Hyundai Motor Company, Seoul (KR); Halla Climate Control Corporation, Daejeon (KR)

( * ) Notice: Subject to any disclaimer, the term of this patent is extended or adjusted under 35 U.S.C. 154(b) by 502 days.

(21) Appl. No.: 11/296,672

(22) Filed: Dec. 6, 2005

(65) Prior Publication Data

US 2007/0102213 A1 May 10, 2007

(30) Foreign Application Priority Data

Nov. 4, 2005 (KR) ...................... 10-2005-0105305

(51) Int. Cl.
*B60K 11/06* (2006.01)
(52) U.S. Cl. ...................... 180/68.1; 180/68.2; 180/68.5
(58) Field of Classification Search ................ 180/68.1, 180/68.2, 65.1, 65.2, 65.3, 68.5
See application file for complete search history.

(56) References Cited

U.S. PATENT DOCUMENTS

| | | | | |
|---|---|---|---|---|
| 4,976,327 | A * | 12/1990 | Abujudom et al. | 180/68.2 |
| 5,983,652 | A * | 11/1999 | Iritani et al. | 62/156 |
| 6,457,542 | B1 * | 10/2002 | Hosono et al. | 180/68.1 |
| 6,779,622 | B2 * | 8/2004 | Mizorogi | 180/297 |
| 7,079,379 | B2 * | 7/2006 | Yamaguchi et al. | 361/676 |
| 2002/0035973 | A1 * | 3/2002 | Takahashi | 123/41.29 |
| 2003/0118891 | A1 * | 6/2003 | Saito et al. | 429/62 |
| 2004/0150271 | A1 * | 8/2004 | Koga et al. | 310/64 |
| 2004/0163861 | A1 * | 8/2004 | Fukuda et al. | 180/65.2 |

FOREIGN PATENT DOCUMENTS

| | | |
|---|---|---|
| KR | 09-188144 | 7/1997 |
| KR | 11-180169 | 7/1999 |
| KR | 2002-144888 | 5/2002 |
| KR | 2005-047489 | 2/2005 |

* cited by examiner

*Primary Examiner*—Paul N Dickson
*Assistant Examiner*—Katy Meyer
(74) *Attorney, Agent, or Firm*—Edwards Angell Palmer & Dodge LLP; Peter F. Corless

(57) ABSTRACT

A cooling system is provided for a battery unit and a motor control unit of a hybrid vehicle. Preferred cooling systems can have a compact structure and can efficiently cool the battery unit and the motor control unit mounted in a vehicle using air, thus ensuring stable operation of the battery unit and the motor control unit and maximizing utilization of space in the vehicle.

6 Claims, 3 Drawing Sheets

COOLING SYSTEM FOR BATTERY UNIT AND MOTOR CONTROL UNIT OF HYBRID VEHICLE

CROSS-REFERENCE TO RELATED APPLICATIONS

The present application is based on, and claims priority from, Korean Application Serial Number 10-2005-0105305, filed on Nov. 4, 2005, the disclosure of which is hereby incorporated by reference herein in its entirety.

FIELD OF THE INVENTION

The present invention relates to a cooling system for a battery unit and a motor control unit for a hybrid vehicle and, in preferred aspects, to the structure of an air duct for cooling a battery unit and an MCU (Motor Control Unit).

BACKGROUND OF THE INVENTION

A battery unit is mounted on a hybrid vehicle and supplies electric energy to an electric motor to drive the driving wheels of the vehicle. A hybrid vehicle also is typically provided with a motor control unit to appropriately control the electric motor.

When the battery unit and the motor control unit are operated, heat is generated. Thus, to prevent damage from heat and ensure stable continuous operation, a proper cooling apparatus is required.

Since the vehicle has limited internal space, the cooling apparatus for the battery unit and the motor control unit must have a compact structure.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, a cooling system for a battery unit and a motor control unit of a hybrid vehicle is provided, which can effectively cool the battery unit and the motor control unit mounted in the hybrid vehicle using air, thus ensuring stable operation of the battery unit and the motor control unit.

In one preferred aspect, a cooling system of the invention suitably includes an air intake duct communicating with the battery unit; an outlet port of the battery unit to discharge the air drawn into the air intake duct; a motor control unit inlet duct; and a motor control unit outlet duct.

In a preferred aspect, a cooling system for a battery unit and a motor control unit of a hybrid vehicle of the invention includes an air intake duct which communicates with the battery unit and draws air from an interior of the vehicle. An outlet port of the battery unit discharges the air drawn into the air intake duct from the battery unit. A motor control unit (MCU) inlet duct preferably extends from the outlet port to the motor control unit. A bypass duct is preferably branched from the outlet port to bypass the motor control unit. Air discharged from the motor control unit passes through an MCU outlet duct. The MCU outlet duct and the bypass duct are preferably joined at a joining duct. Further, a blower fan may be installed at a predetermined position on the joining duct.

The invention also includes vehicles particularly hybrid motor vehicles such as automobiles, trucks and the like that comprise a cooling system as described herein.

It is understood that the term "vehicle" or "vehicular" or other similar terms as used herein is inclusive of motor vehicles in general and hybrid vehicles in particular, such as hybrid passenger automobiles including sports utility vehicles (SUV), buses, trucks, various commercial vehicles, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE INVENTION

Figure 1:
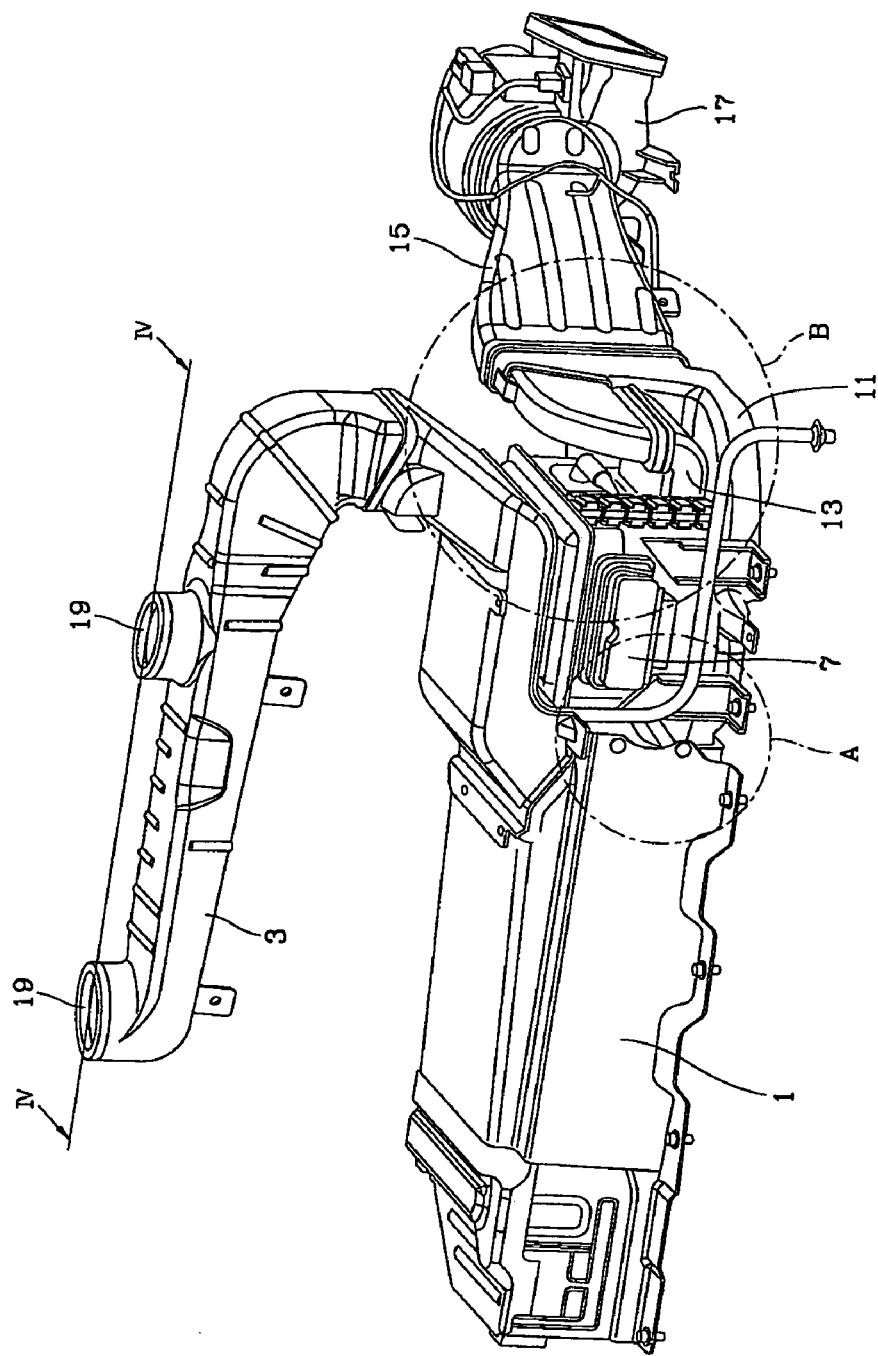
FIG. 1 illustrates a cooling system for a battery unit and a motor control unit of a hybrid vehicle, according to the present invention.
Figure 2:
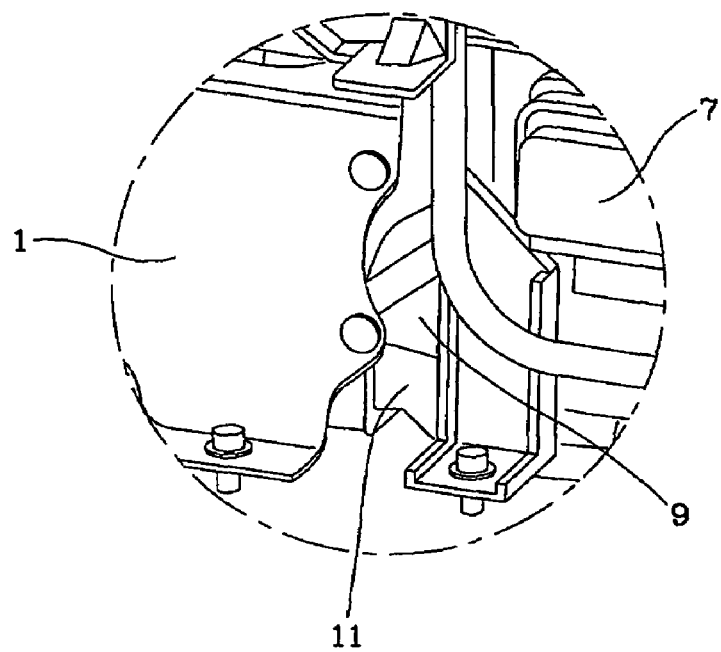
FIG. 2 is a detailed view of an encircled portion marked A in FIG. 1.
Figure 3:
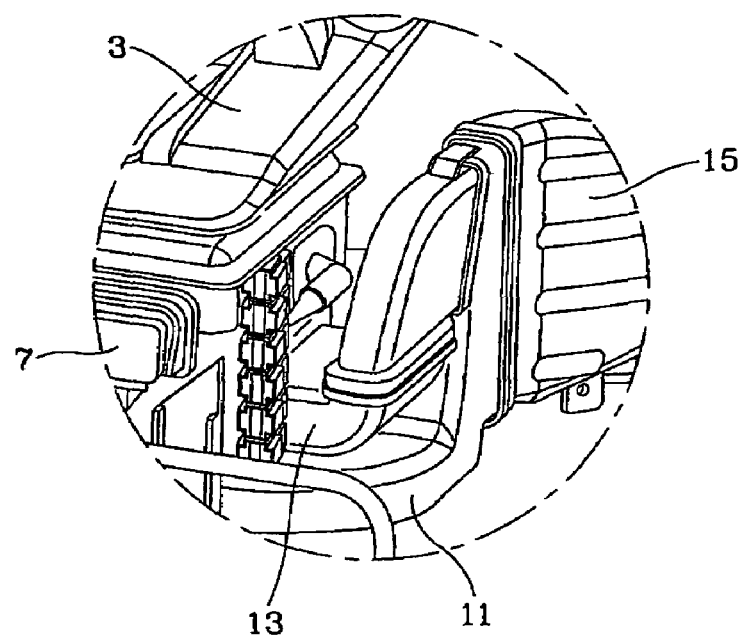
FIG. 3 is a detailed view of an encircled portion marked B in FIG. 1.

As discussed above, a cooling system for a battery unit and a motor control unit of a hybrid vehicle is provided which suitably comprises an air intake duct communicating with the battery unit; an outlet port of the battery unit to discharge the air drawn into the air intake duct; a motor control unit inlet duct; and a motor control unit outlet duct. The air intake duct that communicates with the battery unit preferably draws air from a vehicle interior. The motor control inlet duct suitably extends from the outlet port to the motor control unit. The motor control unit outlet duct suitably discharges air from the motor control unit.

In preferred configurations, the cooling system may include a bypass duct, which is suitably branched from the outlet duct to bypass the motor control unit. The cooling system also may comprise a joining duct at which the motor control unit outlet and the bypass duct are joined.

The cooling system also may comprise a blower fan positioned at a cooling effective position within the cooling system, such as on the joining duct.

A preferred embodiment of the present invention is now described with reference to the accompanying drawings.

Referring to FIGS. 1 to 4, a preferred cooling system of the present invention includes an air intake duct 3, an outlet port 5, an MCU inlet duct 9, a bypass duct 11, an MCU outlet duct 13, a joining duct 15, and a blower fan 17. The air intake duct 3 communicates with a battery unit 1, and draws air from the interior of the vehicle. The outlet port 5 of the battery unit 1 discharges air, fed from the air intake duct 3, from the battery unit 1. The MCU inlet duct 9 branches from the outlet port 5 and extends to a motor control unit 7. The bypass duct 11 branches from the outlet port 5 to bypass the motor control unit 7. Air discharged from the motor control unit 7 passes through the MCU outlet duct 13. The MCU outlet duct 13 joins the bypass duct 11 at the joining duct 15. The blower fan 17 is installed at a predetermined position on the joining duct 15.

The air intake duct 3 is arranged above the battery unit 1, and a plurality of inlet ports 19, each of which is open upwards to draw air in the vehicle, is suitably provided in a longitudinal direction of the air intake duct 3 in series. The overall shape extending from the inlet ports 19 to the battery unit 1 is preferably a C shape.

According to this embodiment, the battery unit 1 and the motor control unit 7 are mounted in a trunk room. The air intake duct 3 functions to couple the trunk room to the interior of the vehicle, and two inlet ports 19 are formed in the air intake duct 3 to communicate with the interior of the vehicle (see, FIGS. 1 and 4).

The air intake duct 3 communicates with the upper corner of the battery unit 1, and the motor control unit 7 is suitably positioned adjacent to the battery unit 1. Further, the lower surface of the air intake duct 3 suitably contacts the upper surface of the motor control unit 7.

Therefore, in this preferred configuration, air flowing in the air intake duct 3 can serve to indirectly cool the motor control unit 7.

The outlet port 5 of the battery unit 1 is formed in the lower portion of a junction between the battery unit 1 and the air intake duct 3.

Figure 4:
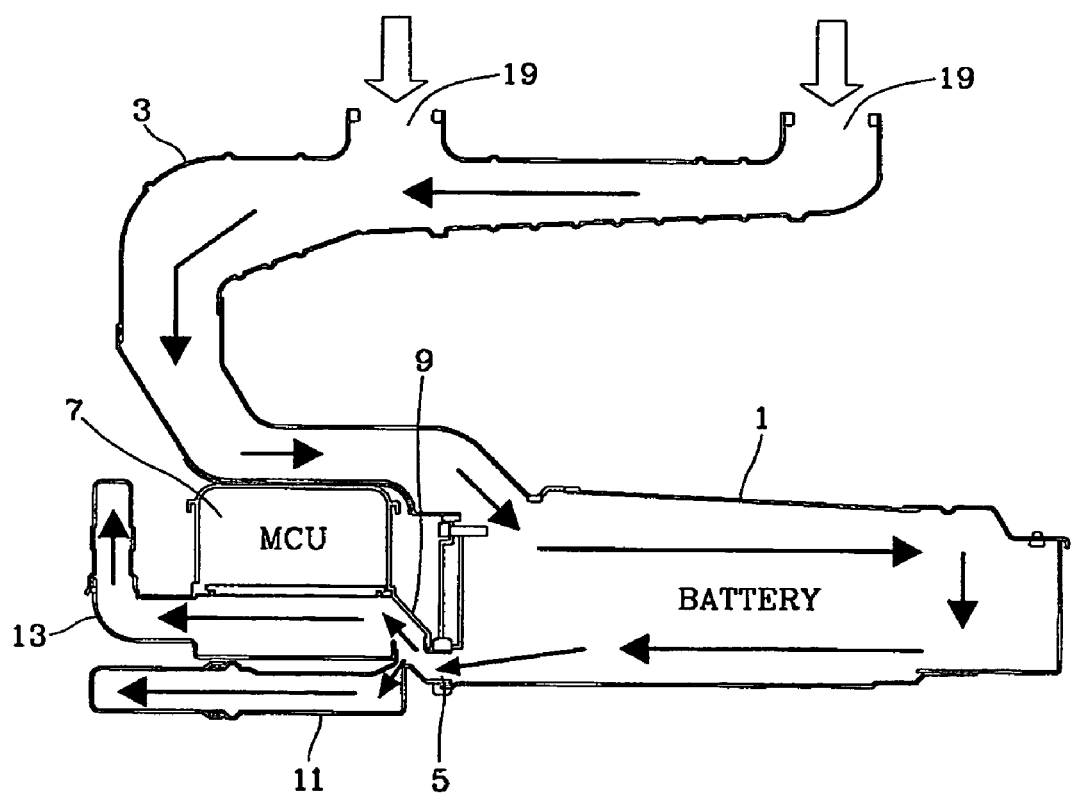
FIG. 4 is a sectional view taken along IV-IV of FIG. 1.

Thus, as shown in FIG. 4, in a preferred arrangement, air fed from the air intake duct 3 circulates through the battery unit 1 once, prior to being discharged through the outlet port 5.

The MCU inlet duct 9 and the bypass duct 11 are suitably vertically arranged at upper and lower positions. The MCU outlet duct 13 and the bypass duct 11 are suitably vertically arranged at upper and lower positions.

Further, the MCU outlet duct 13 and the bypass duct 11 are suitably provided adjacent to the motor control unit 7, and are preferably bent in a direction perpendicular to a straight line connecting the battery unit 1 and the motor control unit 7.

However, the MCU outlet duct 13 and the bypass duct 11 do not contact the side of the motor control unit 7, in preferred configurations.

Such arrangement and shape of the MCU inlet duct 9, the MCU outlet duct 13, and the bypass duct 11 ensure smooth air flow, and require a relatively small space, thus enhancing the utilization of space in a vehicle.

Air discharged from the blower fan 17, which is provided at an end of the joining duct 15, is discharged out of the vehicle.

The cooling system for the battery unit and the motor control unit of the hybrid vehicle constructed as described above draws air present in the vehicle into the inlet ports 19 of the air intake duct 3, using a suction force which is generated via blower fan 17.

The drawn air flows along the air intake duct 3, and is supplied to the battery unit 1.

Air fed to the battery unit 1 absorbs heat from the battery unit 1 while circulating in the battery unit 1. Thereafter, the air is discharged to the outlet port 5.

When the battery unit 1 is normally operated, and a normal cooling operation is thus implemented, the temperature of air discharged from the outlet port 5 does not generally exceed 45° C.

When considering that the maximum temperature of the trunk room in which the battery unit 1 and the motor control unit 7 is installed is up to 65° C., the temperature of air discharged from the outlet port 5 of the battery unit 1 is sufficient to cool the motor control unit 7.

Air discharged from the outlet port 5 is fed through the MCU inlet duct 9 into the motor control unit 7, and absorbs heat from the motor control unit 7 while passing through the motor control unit 7.

Air, having absorbed heat from the motor control unit 7, is discharged through the MCU outlet duct 13, and is fed into the joining duct 15 along with air fed through the bypass duct 11.

Hot air is discharged from the joining duct 15 to the outside of the vehicle by the blower fan 17.

Such preferred cooling system for the battery unit and the motor control unit of the hybrid vehicle as described is capable of simultaneously cooling the battery unit 1 and the motor control unit 7 positioned adjacent to the battery unit 1, using air blown by one blower fan 17, thus reducing the number of components used, and saving space.

Further, the arrangement and shape of the MCU inlet duct 9, the MCU outlet duct 13, and the bypass duct 11 afford a compact structure which requires relatively minimal space in the vehicle.

As apparent from the foregoing, cooling systems of the invention can offer notable advantages including compact structure and efficient cooling of a battery unit and a motor control unit mounted in a vehicle using air, thus ensuring stable operation of the battery unit and the motor control unit and maximizing utilization of space in a vehicle.

Although preferred embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. A cooling system for a battery unit and a motor control unit of a hybrid vehicle, comprising:
   an air intake duct communicating with the battery unit, and drawing air from an interior of the vehicle;
   an outlet port of the battery unit to discharge the air drawn into the air intake duct from the battery unit;
   an MCU inlet duct extending from the outlet port to the motor control unit;
   a bypass duct branched from the outlet port to bypass the motor control unit;
   an MCU outlet duct through which air discharged from the motor control unit passes;
   a joining duct at which the MCU outlet duct and the bypass duct are joined; and
   a blower fan installed at a predetermined position on the joining duct,
   wherein said air intake duct is arranged above the battery unit;
   a plurality of inlet ports is arranged in a longitudinal direction of the air intake duct in series, and is open upwards to draw air from the interior of the vehicle; and
   an overall shape of a part extending from the inlet ports to the battery unit is a C shape.

2. The cooling system as defined in claim 1, wherein said air intake duct communicates with an upper corner of the battery unit;
   the motor control unit is positioned adjacent to the battery unit; and
   a lower surface of the air intake duct is in contact with an upper surface of the motor control unit.

3. The cooling system as defined in claim 2, wherein said outlet port of the battery unit is formed in a lower portion of a junction of the battery unit and the air intake duct.

4. The cooling system as defined in claim 3, wherein the MCU inlet duct and the bypass duct are vertically arranged at upper and lower positions.

5. The cooling system as defined in claim 4, wherein the MCU outlet duct and the bypass duct are vertically arranged at upper and lower positions, and are bent to be perpendicular to a straight line connecting the battery unit to the motor control unit 6. A hybrid vehicle comprising a cooling system of claim 1.

* * * * *